Figure 1:
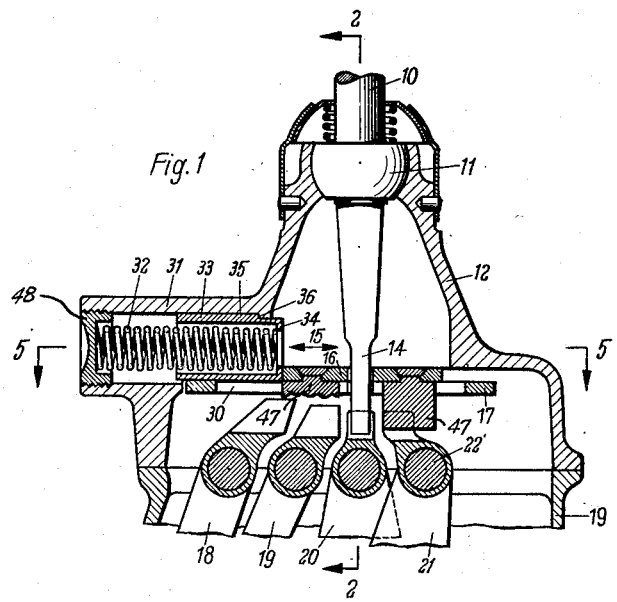

July 27, 1954    W. R. NAUMANN    2,684,600
SHIFTING MECHANISM FOR TRANSMISSIONS
Filed Dec. 23, 1950    2 Sheets-Sheet 1

INVENTOR
WILLY R. NAUMANN
BY:
Hauetine, Lake & Co.
AGENTS

July 27, 1954    W. R. NAUMANN    2,684,600
SHIFTING MECHANISM FOR TRANSMISSIONS
Filed Dec. 23, 1950                    2 Sheets-Sheet 2

INVENTOR
WILLY R. NAUMANN
By:
Hauetine, Lake & Co.
AGENTS

UNITED STATES PATENT OFFICE 2,684,600

SHIFTING MECHANISM FOR TRANSMISSIONS

Willy R. Naumann, Stuttgart-Degerloch, Germany, assignor to Daimler-Benz Aktiengesellschaft, Stuttgart-Unterturkheim, Germany Application December 23, 1950, Serial No. 202,498

Claims priority, application Germany December 28, 1949

3 Claims. (Cl. 74—477)

1

The invention is concerning a shifting mechanism for transmissions with at least three speeds, especially for gear transmissions of motor vehicles. An essential object of the invention is a facilitated shifting of the transmission, especially a facilitated shifting-over from a certain gear, for instance the first gear, to another gear, for instance the second gear, the shifting ways of both gears being offset to each other in cross direction within a gear shifting gate, as this is usually the case for instance with five-gear-transmissions of commercial vehicles.

With the usual shifting mechanisms for transmissions of this type especially a non-skilled driver is frequently not able to change fast enough from the first to the second speed. But for starting for instance a fully loaded road train on an ascending road a fast shifting is required, or else the road train comes to a standstill again before the second speed is shifted in.

Therefore one feature of the invention consists in the fact that a spring stop member is provided which by the effect of the spring tries to push the gear control member in the cross direction from the shifting way for the one speed towards the shifting way for the other speed offset in the cross direction, but which stop member is prevented from moving farther the gear control member being relieved of the pressure of the stop member as soon as it has reached the shifting way for the second speed. Therefore the driver, when shifting to a higher speed, has only to push forward the shifting lever, out of the shifting way of the first speed, whereupon the spring-controlled stop member will automatically move the shifting lever in the cross direction, exactly to the shifting way of the second speed, and, under the pressure of the driver's hand still weighing upon it, the lever slides forward immediately into the shifting way for the second speed.

According to a further feature of the invention that corner of the gear shifting gate at the crossing between the cross way for the neutral mean position of the gear control member and the longitudinal way for the second speed, round which the shifting lever has to be moved when changing to the second gear, is shaped with a large radius, especially with a larger one than the other corners of the gear shifting gate, to a further completion of this effect.

A further feature of the invention consists in the fact that a detent means, movable vertically to the stop member, for instance a spring-pressed ball or bolt rounded off at its front end, cooperates with recesses or grooves arranged at the stop

2 member, especially in such a way that it opposes the movement of the stop member and therefore of the shifting lever at the change to a lower speed with an effective resistance during a relatively small period only, when the shifting lever has reached its position in front of the shifting way of one of the lower gears, but prevents the reverse movement of the stop member as little as possible during the change to a higher gear. Therefore only a weak spring is wanted for the stop device, and the driver needs not constantly resist to a strong spring pressure with his hand during the change to a lower gear.

Further details and features of the invention are to be seen from the example of an embodiment of the invention described in the following, to which the invention is, however, not restricted.

Figure 2:
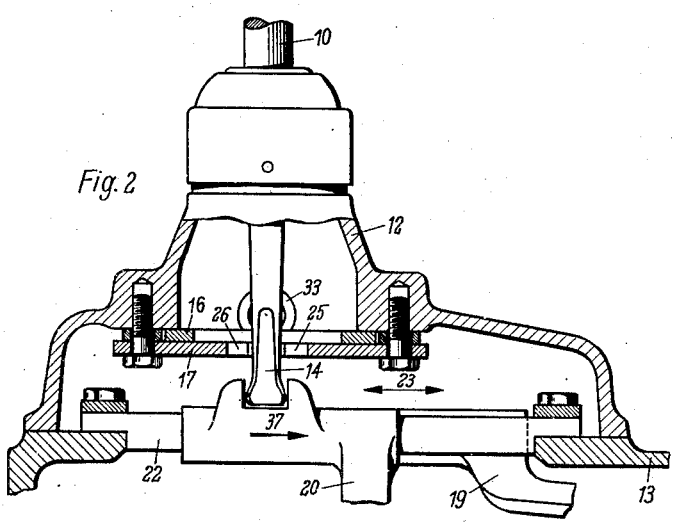
Figure 3:
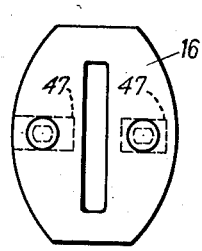
Figure 4:
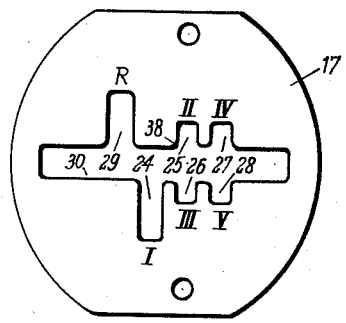
Figure 5:
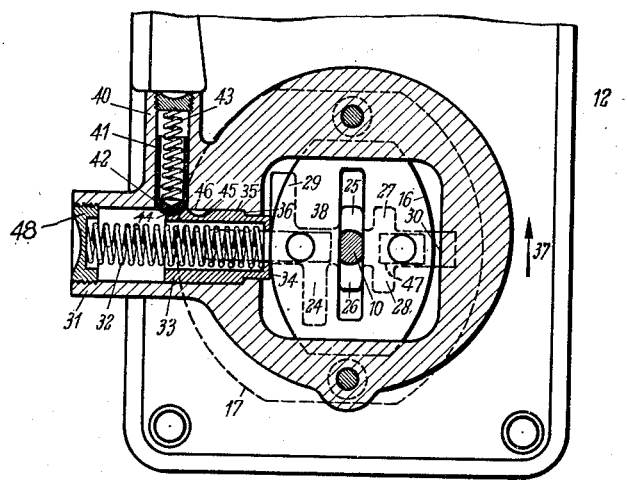

Fig. 1 shows a cross section of the upper part of a five speed-gear transmission, Fig. 2 a longitudinal section according to the line 2—2 of Fig. 1, Fig. 3 a top view of the holding plate for the shifting lever guide, Fig. 4 the gate plate of the shifting lever guide, also in top view, and Fig. 5 a horizontal section according to the line 5—5 of Fig. 1.

The shifting lever 10 is in the usual way suspended in a ball and socket joint at point 11 on the cover 12 of the transmission box 13 and guided at its lower end 14 in a longitudinal slot provided in a plate 16 displaceable in the direction of the arrows 15 and in the gate plate 17 fixed by screws to the cover in such a way that for the shifting of the different gear steps of the transmission it can only be moved to and fro in determined ways in the longitudinal or in the cross-direction. Thereby the lower end of the shifting lever may engage anyone of the gear shifting forks 18—21 slidably arranged on the guide rods 22 for movement in the direction of the arrows 23 and adapted by their fork-shaped lower ends (not shown on the drawing) to shift the transmission gears or clutches of the transmission for engaging and disengaging the different gear steps. The fork 18 shifts the reverse gear, the fork 19 the first gear, the fork 20 the second and third gear and the fork 21 the fourth and fifth gear of the transmission. The corresponding shifting scheme for the movement of the lower end of the shifting lever can be seen from Fig. 4, in which the position of the shifting lever end is marked by the letter R for the reverse gear and by the numbers I to V for the five forward gears.

The plate 16 is guided for movement in the direction of arrow 15 by two depending rectangular projections 47 indicated by dotted lines in Fig. 3 and extending through the transverse slot of gate plate 17. Such projections 47 which may be riveted to plate 16 engage all of the forks 18—21 other than the particular fork selected and engaged by lever 14 and lock the same to prevent accidental displacement thereof. Plate 16, therefore, constitutes, in effect, a locking member and will be so referred to in the claims. In Fig. 1 the left projection 47 is shown partly broken away to more clearly represent the recessed upper ends of forks 18 and 19.

As can be seen from Figure 4 the shifting way 25 for the second speed is offset in the cross direction with respect to the shifting way 24 for the first speed in such a way that between the disengagement of the first and the engagement of the second gear a slight cross movement of the shifting lever 10 is required. In order to give the driver a feeling for the size of this cross movement and to enable a fast and secure shifting from the first to the second gear, a stop device formed by a spring-pressed plunger 33 is arranged in a cylindrical part 31 of the box cover 12, which plunger can be axially displaced against the effect of the helical spring 32 and whose front end 34 is placed against the holding plate 16 and, if no counter-forces are working upon the shifting lever, moves the holding plate together with the shifting lever into the position shown on the drawing, in which the stop device with its shoulder 35 is placed at a stop shoulder 36 of the guide cylinder 31. The cylindrical guideway 31 is provided with a second stop constituted by a threaded plug 48 engaging internal threads of the cylindrical guideway 31 and affording a rest for the one end of the spring 32, the other end of such spring engaging an internal flange provided at the end 34 of the hollow plunger 33. The pair of stops 48 and 36 will limit the stroke of plunger 33, such stroke being substantially equal to the distance between the upper ends of the first gear shifting fork 18 and the third gear shifting fork 20, or rather between the parallel paths of movement of such upper ends. When the parts assume the position shown in Fig. 1, the lower end of the shifting lever is thus positioned exactly in front of the shifting way 25 for the second gear, so that a simple pressure of the shifting lever in the direction of the arrow 37 is sufficient to engage the second gear. When the shift lever 10, 14 is adjusted into engagement with fork 19, the member 16 being mounted for common selective transverse adjustment with the shift lever 10, 14 will urge plunger 33 to a position in the middle of its stroke in which plunger 33 is spaced from both of its stops 36 and 48. In this position the plunger is impositively retained by a detent pin 41 in a manner explained hereinafter. Practically the measure described above has the effect that the driver when shifting from the first to the second gear has only to make a single movement in the direction of the arrow 37. The slight cross movement is thereby effected by the stop pin 33 without the driver being aware of it. When changing from the first to the second gear the shifting of the shifting lever into the shifting way 25 is further facilitated by the fact that the corner 38 of the gear shifting gate, at which the longitudinal path 25 for the second gear step is intersecting the cross path 39 for the neutral mean position of the shifting lever, and round which the shifting lever when moving to the second gear has to be guided, is curved with a larger radius than the corners of the other intersections between the longitudinal paths and the cross path. The further shifting from the second to the third, fourth and fifth gears can be effected without any risk of a faulty operation, as for shifting to the third gear only a straight movement opposite to the direction of the arrow 37 has to be effected and as for engaging the fourth and fifth gear the required cross movement of the shifting lever is restricted by the end of the cross way 30.

The operation of shifting back to the second gear can as easily be effected without the driver having to work against the pressure of any spring. The risk of an accidental shifting from the fourth to the first gear directly is prevented by the fact that the holding plate 16 engages the stop device 33 again, as soon as the lower end of the shifting lever 10 has reached the shifting way 26 for the third gear, so that the further shifting to the first gear can be effected against the pressure of the stop spring 32 only.

In order to make this resistance strong enough for the driver to observe it without being obliged to make the initial tension of the spring 32 too high, a detent pin 41 is arranged vertically to the stop device 33 in a cylindrical guide 40. The hemispherical front end 42 of the detent pin 41 under the effect of the helical spring 43 engages a flat recess 44 provided in plunger 33. A second recess 45 is arranged in the plunger in such a way that the detent pin snaps into it when the lower end of the shifting lever 10 has reached the shifting way 24 for the first gear. Therefore the driver has only to push back the detent pin 41 by a short movement of the shifting lever when changing from the second to the first gear and can by the snapping of the pin into the recess 45 feel distinctly when the shifting lever has reached the shifting way for the first gear. If he wants to shift into the reverse gear, another short movement of the shifting lever is sufficient to push also the detent pin 41 out of the recess 45 and to move the shifting lever up to the shifting way 29 for the reverse gear.

Therefore the stop spring 32 can be chosen relatively weak, so that the driver, when shifting to the first and to the reverse gear has to overcome the pressure of the detent spring 43 for a short distance only and for the rest of the shifting way has not to work against any essential resistance. When shifting back from the reverse gear to the first and second speed the spring 32 is strong enough to overcome the resistance offered by the detent pin 41 and to move the blocking plate 16 and the shifting lever to the shifting position required, as the detent pin 41 in reverse speed does not snap into any recess of the plunger 33. It is to be understood, of course, that the sides of the recesses 44 and 45 are but slightly inclined and unable to lock plunger 33 against the effect of the spring 32.

What I claim is:

1. In a gear shifting mechanism, the combination of a plurality of shift forks including a first group of two shift forks for the lowest forward speed and for reverse and a second group of two shift forks for the other forward speeds, a shift lever, guide means for freely guiding said shift lever transversely of all of said shift forks for selective engagement with any one of all of said shift forks, said guide means including blocking means for preventing operation of all of said shift forks except the one selectively engaged and co-operating with said shift lever to provide for common movement therewith in said transverse direction, spring means abutting only against said guide means for urging said guide means into a position corresponding to the engagement of said shift lever with said second group of shift forks, means for limiting abutting engagement of said spring means with said guide means only over a distance corresponding to engagement of said shift lever with said first group of said shift forks, and resilient detent means for resiliently detaining said spring means in a position corresponding to engagement of said shift lever with said lowest speed, the shift fork of said lowest speed being located next adjacent a shift fork for a higher forward speed.

2. In a gear shifting mechanism, the combination of a housing, of a plurality of shift forks including a first shift fork for reverse, a second shift fork for the lowest forward speed and at least one further shift fork for higher forward speeds located adjacent each other in a transverse direction in the sequence enumerated above, a shift lever for selectively engaging any one of said shift forks, gate plate means secured to said housing for guiding said shift lever for selective engagement with any one of said shift forks, guide plate means operative to move in unison with said shift lever in said transverse direction and to provide relative movement perpendicular to said transverse direction, means at said guide plate means for simultaneously limiting relative movement between said guide plate means and said gate plate means in said transverse direction and for blocking all of said shift forks except the one selectively engaged by said shift lever, spring means operatively engaging said guide plate means for urging said guide plate means in said transverse direction toward said further shift fork, means for limiting operative engagement of said spring means with said guide plate means over a distance corresponding to engagement of said shift lever with said first and second shift forks, and resilient detent means for resiliently detaining said spring means in a position corresponding to the engagement of said shift lever with said second shift fork.

3. In a gear shifting mechanism, the combination of a housing, of a plurality of shift forks including a first shift fork for reverse, a second shift fork for the lowest forward speed and at least one further shift fork for higher forward speeds located adjacent each other in a transverse direction in the sequence enumerated above, a shift lever for selectively engaging any one of said shift forks, gate plate means secured to said housing for guiding said shift lever for selective engagement with any one of said shift forks, guide plate means operative to move in unison with said shift lever in said transverse direction and to provide relative movement perpendicular to said transverse direction, means at said guide plate means for simultaneously limiting relative movement between said guide plate means and said gate plate means in said transverse direction and for blocking all of said shift forks except the one selectively engaged by said shift lever, spring means operatively engaging said guide plate means for urging said guide plate means in said transverse direction toward said further shift fork, means for limiting operative engagement of said spring means with said guide plate means over a distance corresponding to engagement of said shift lever with said first and second shift forks, and resilient detent means for resiliently detaining said spring means in a position corresponding to the engagement of said shift lever with said second shift fork, said gate plate means being provided with channels including a neutral channel for guiding said shift lever, the channel corresponding to the next higher speed than said lowest speed having a larger radius of curvature along the corner thereof nearer said lowest speed than along the other corner to facilitate shifting from said lowest to said next higher speed.

References Cited in the file of this patent

UNITED STATES PATENTS

| Number | Name | Date |
|---|---|---|
| 1,727,646 | Hunt | Sept. 10, 1929 |
| 1,830,797 | Lapsley | Nov. 10, 1931 |

FOREIGN PATENTS

| Number | Country | Date |
|---|---|---|
| 657,322 | Germany | May 11, 1935 |